US009875050B2

(12) United States Patent
Chen et al.

(10) Patent No.: US 9,875,050 B2
(45) Date of Patent: Jan. 23, 2018

(54) DISK MANAGEMENT IN DISTRIBUTED STORAGE SYSTEM INCLUDING GROUPING DISKS INTO COLD AND HOT DATA DISK RINGS AND REDUCING A SPINNING RATE OF DISKS STORING COLD DATA

(71) Applicant: International Business Machines Corporation, Armonk, NY (US)

(72) Inventors: Lei Chen, Shanghai (CN); Li Chen, Yixing (CN); Xiaoyang Yang, San Francisco, CA (US); Jun Wei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 14/867,042

(22) Filed: Sep. 28, 2015

(65) Prior Publication Data
US 2016/0154601 A1    Jun. 2, 2016

(30) Foreign Application Priority Data
Nov. 28, 2014   (CN) .......................... 2014 1 0708705

(51) Int. Cl.
G06F 3/06      (2006.01)
G06F 1/32      (2006.01)

(52) U.S. Cl.
CPC ............ G06F 3/0625 (2013.01); G06F 3/067 (2013.01); G06F 3/0647 (2013.01);
(Continued)

(58) Field of Classification Search
CPC ...... G06F 3/0625; G06F 3/0638; G06F 3/067; G06F 3/0647; Y02B 60/1225; Y02B 60/1228; Y02B 60/1246; Y02B 60/162
See application file for complete search history.

(56) References Cited

U.S. PATENT DOCUMENTS 5,666,538 A * 9/1997 DeNicola .............. G06F 1/3221
709/217
8,214,661 B2   7/2012 Cooper et al.
(Continued)

OTHER PUBLICATIONS

Pending CN Application No. 201410708705.9, filed on Nov. 28, 2014, entitled: "Method and System for Disk Management in Distributed Storage System", 22 pages.
(Continued)

*Primary Examiner* — Mark Giardino, Jr.
*Assistant Examiner* — Glenn Gossage
(74) *Attorney, Agent, or Firm* — Michael O'Keefe

(57) ABSTRACT

A method, computer program product, and computer system are disclosed for disk management in a distributed storage system, wherein the distributed storage system comprises a plurality of disks within a main disk ring, and the disks store target data. In one embodiment, the method comprises dividing the target data into cold target data and hot target data, and grouping one or more disks within the main disk ring into a cold data disk ring and the remaining one or more disks within the main disk ring into a hot data disk ring, based on the cold target data's and the hot target data's positions on disks. The method further comprises migrating the cold target data on disks not within the cold data disk ring onto disks within the cold data disk ring while migrating the hot target data on disks not within the hot data disk ring onto disks within the hot data disk ring, and reducing a spinning rate of disks within the cold data disk ring.

18 Claims, 5 Drawing Sheets

(52) U.S. Cl.
CPC ....... *Y02B 60/1225* (2013.01); *Y02B 60/1246* (2013.01); *Y02B 60/162* (2013.01)

(56) References Cited

U.S. PATENT DOCUMENTS

| | | |
|---|---|---|
| 8,538,926 B2 | 9/2013 | Barton et al. |
| 8,745,327 B1* | 6/2014 | Throop ................. G06F 3/0647 711/100 |
| 2002/0199129 A1* | 12/2002 | Bohrer ................. G06F 3/0614 714/6.32 |
| 2003/0126391 A1* | 7/2003 | Neufeld ................. G06F 3/0601 711/165 |
| 2006/0069886 A1* | 3/2006 | Tulyani ................. G06F 3/0605 711/161 |
| 2007/0061515 A1 | 3/2007 | Kano |
| 2010/0274982 A1 | 10/2010 | Mehr et al. |
| 2011/0276620 A1 | 11/2011 | Pirzada et al. |
| 2012/0057407 A1 | 3/2012 | Montgomery et al. |
| 2012/0089799 A1* | 4/2012 | Wei .................... G06F 11/1662 711/162 |
| 2012/0233484 A1* | 9/2012 | Rossi .................... G06F 1/3268 713/324 |
| 2013/0290598 A1 | 10/2013 | Fiske et al. |
| 2013/0297905 A1* | 11/2013 | Yang ........................ G06F 12/02 711/165 |
| 2015/0006816 A1* | 1/2015 | Gong .................... G06F 3/0647 711/114 |

OTHER PUBLICATIONS

Hasebe et al., "Power-Saving in Large-Scale Storage Systems with Data Migration", 2nd IEEE International Conference on Cloud Computing Technology and Science, 2010, pp. 266-273.

De La Luz et al., "Reducing Memory Energy Consumption of Embedded Applications That Process Dynamically Allocated Data", IEEE Transactions on Computer-Aided Design of Integrated Circuits and Systems, vol. 25, No. 9, Sep. 2006, pp. 1855-1861.

Ye et al., "Virtual Machine Based Energy-Efficient Data Center Architecture for Cloud Computing: A Performance Perspective", 2010 IEEE/ACM International Conference on Green Computing and Communications & 2010 IEEE/ACM International Conference on Cyber, Physical and Social Computing, pp. 171-178.

* cited by examiner

DISK MANAGEMENT IN DISTRIBUTED
STORAGE SYSTEM INCLUDING GROUPING
DISKS INTO COLD AND HOT DATA DISK
RINGS AND REDUCING A SPINNING RATE
OF DISKS STORING COLD DATA

BACKGROUND

Various embodiments of the invention relate to the technology of storage, and more specifically, to disk management in a distributed storage system.

The widely adopted object storage technology has generated massive applications using commercial disk drives in cloud, social network and mobile internet areas, some of which generate billions of photos per day. Enterprises are gradually adopting commercial disks to store critical data such as scanned images, audio/video recording, etc. To avoid data lost in case of disk failures, replication of target data is commonly used to store multiple copies of the target data onto different disks that are physically separated by nodes, racks, or sites. In order to achieve higher performance and higher availability, more commercial disks are used to store data in a highly distributed way for both the data and its replication.

The increase of disk consumption has already created heavy power consumption issues for many internet companies. This is especially challenging as applications require keeping all object data on disks for fast access and for longer retention regardless of whether the target data is on a spinning disk or is accessed once every few years.

SUMMARY

A method and system for disk management in distributed storage system is proposed in this invention to reduce power consumption while commercial disk drives are used.

According to an aspect of the present invention, there is provided a method for disk management in a distributed storage system, where the distributed storage system includes a plurality of disks within a main disk ring, and the plurality of disks store target data, the method including dividing the target data into cold target data and hot target data, grouping one or more disks within the main disk ring into a cold data disk ring and grouping one or more remaining disks within the main disk ring into a hot data disk ring, based on the cold target data's position on the one or more disks and the hot target data's position on the one or more disks, migrating the cold target data on a disk not within the cold data disk ring onto the one or more disks within the cold data disk ring while migrating the hot target data on a disk not within the hot data disk ring onto the one or more disks within the hot data disk ring; and reducing a spinning rate of the one or more disks within the cold data disk ring.

According to another aspect of the present invention, there is provided a device for disk management in a distributed storage system, wherein the distributed storage system includes one or more disks within a main disk ring, and the one or more disks store target data, the device including dividing the target data into cold target data and hot target data; grouping means configured to group one or more disks within the main disk ring into a cold data disk ring and the remaining one or more disks in the main disk ring into a hot data disk ring, based on the cold target data's position on the one or more disks, and the hot target data's position on the one or more disks, migrating means configured to migrate the cold target data on a disk not within the cold data disk ring onto the one or more disks within the cold data disk ring while migrating the hot target data on a disk not within the hot data disk ring onto the one or more disks within the hot data disk ring, and spinning rate reducing means configured to reduce a spinning rate of the one or more disks within the cold data disk ring.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, the disclosed embodiments are provided for the thorough and complete understanding of the present disclosure, and completely conveying the scope of the present disclosure to those skilled in the art.

Figure 1:
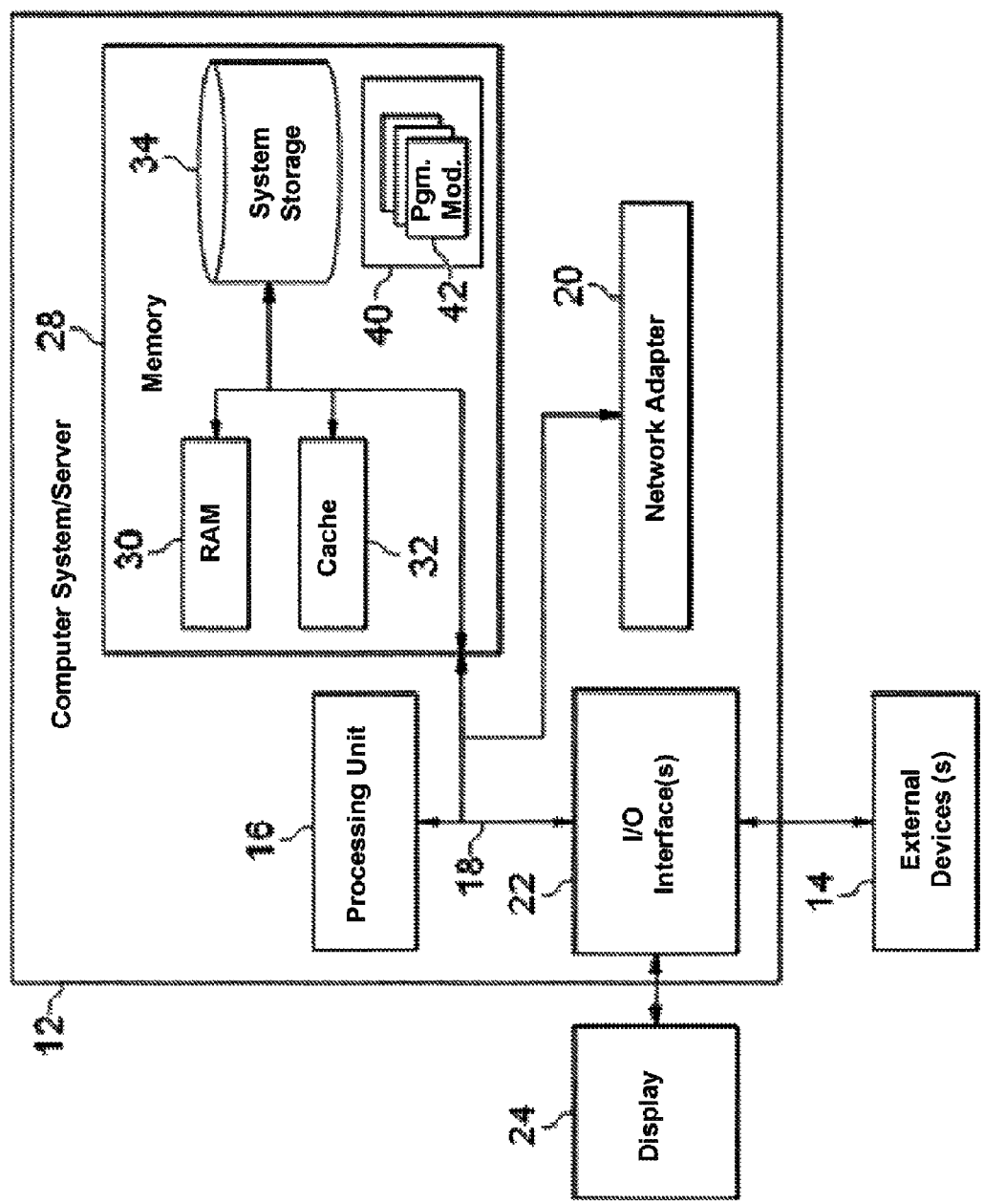
FIG. 1 shows an exemplary computer system/server which is applicable to implement the embodiments of the invention.

Referring now to FIG. 1, an exemplary computer system/server 12 which is applicable to implement an embodiment of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor units 16.

Bus 18 represents one or more of any of several types of bus structures, including a memory bus, a peripheral bus, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disk-read only memory (CD-ROM), digital versatile disk-read only memory (DVD-ROM), or other optical media can be provided. In such instances, each can be connected to bus 18 by one or more data media interfaces. As will be further depicted and described below, system memory 28 may include at least one program product having a set (e.g., at least one) of program modules that are configured to carry out functions of embodiments of the invention.

Program/utility 40, having program modules 42, may be stored in system memory 28 by way of example, and not limitation, as may an operating system, one or more application programs, other program modules, and program data. Each of the operating systems, one or more application programs, other program modules, and program data, or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It may be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2:
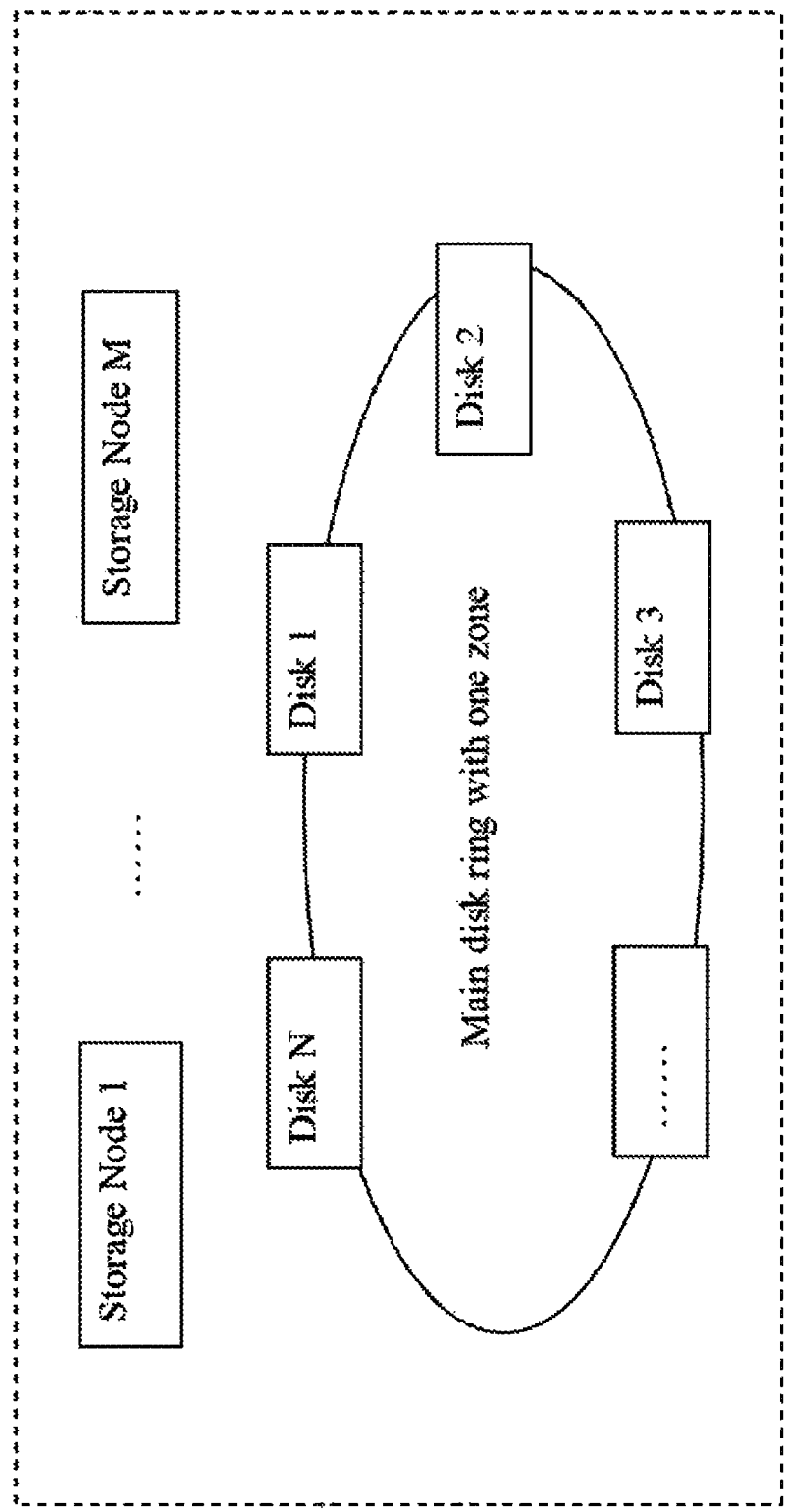
FIG. 2 shows an existing distributed storage structure with one zone.

A distributed storage structure is utilized in the existing object storage technology. FIG. 2 shows an existing distributed storage structure with one zone, in which M storage nodes have their target data stored onto N disks, forming a main disk ring with one zone. The main disk ring is not the ring concept in graph theory but a logic concept frequently used by those skilled in the art of distributed systems. The logic concept means that some disks in the storage system form a logical group. Thus, the storage system can map the stored locations of the target data to the locations on each disk respectively, based on a predefined rule.

In the storage system, target data which is accessed frequently is known as hot target data; while target data which is seldom accessed is known as cold target data. The target data stored in N disks forming the main disk ring and spinning with the same rate are a blend of the hot target data and the cold target data. Disks can be configured at multiple spinning rates. The faster the disk spins, the more quickly the files are searched, the more quickly the files are transferred. However, many negative effects are brought by the quick commercial disk spinning rate. For example, the temperature increases and the wear of the motor spindle increases. This results in reducing the disk service life and increasing the power consumption of the motor, resulting in increased power consumed in unit time, etc. The disk spinning rate can be controlled by command interfaces. In this invention, the disk spinning rate can be dynamically adjusted according to demand in order to reduce the energy consumption of the storage system.

A basic idea of the invention is to separate the cold target data from the hot target data and to store each of them on disks within different disk rings. The disks within different disk rings are configured with different spinning rates, so as to reduce the energy consumption of the system and further improve the life of the whole storage system without decreasing the efficiency and usability of the system.

Figure 3:
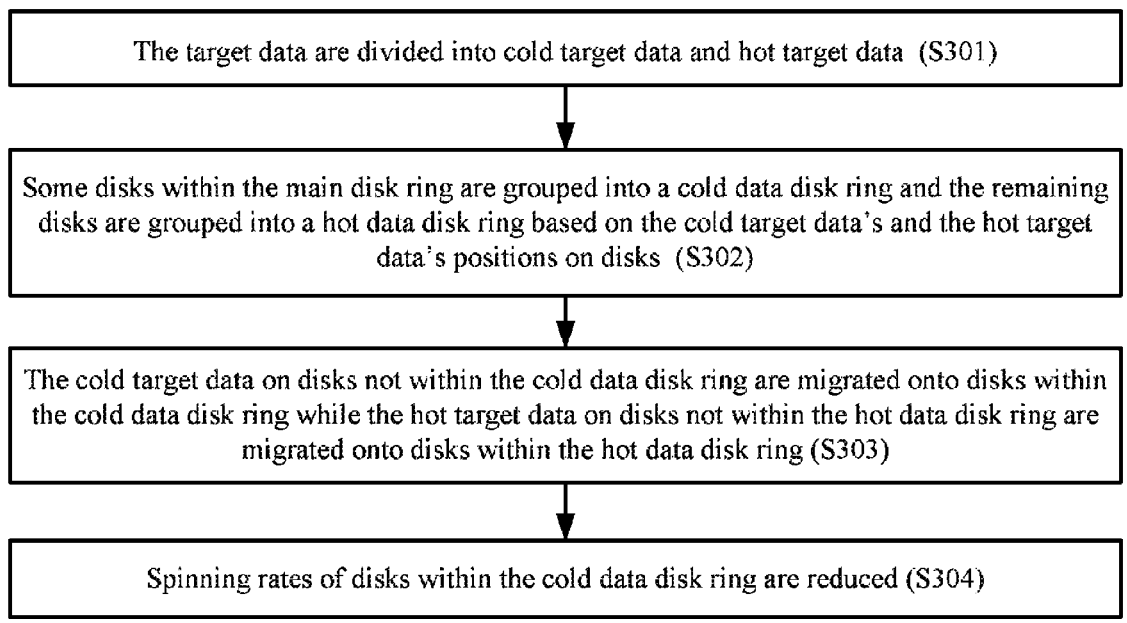
FIG. 3 schematically shows the flowchart of a method for disk management in a distributed storage system according to an embodiment of the invention.

According to an embodiment of the invention, a method for disk management in a distributed storage system is disclosed. FIG. 3 schematically shows the flowchart of a method for disk management in a distributed storage system wherein the distributed storage system includes a plurality of disks within a main disk ring, and the disks store target data. According to FIG. 3, the method includes the following steps.

In step S301, the target data are divided into cold target data and hot target data.

In step S302, some disks within the main disk ring are grouped into a cold data disk ring and the remaining disks are grouped into a hot data disk ring based on the cold target data's and the hot target data's positions on disks.

In step S303, the cold target data on disks not within the cold data disk ring are migrated onto disks within the cold data disk ring while the hot target data on disks not within the hot data disk ring are migrated onto disks within the hot data disk ring.

In step S304, spinning rates of disks within the cold data disk ring are reduced.

Figure 4:
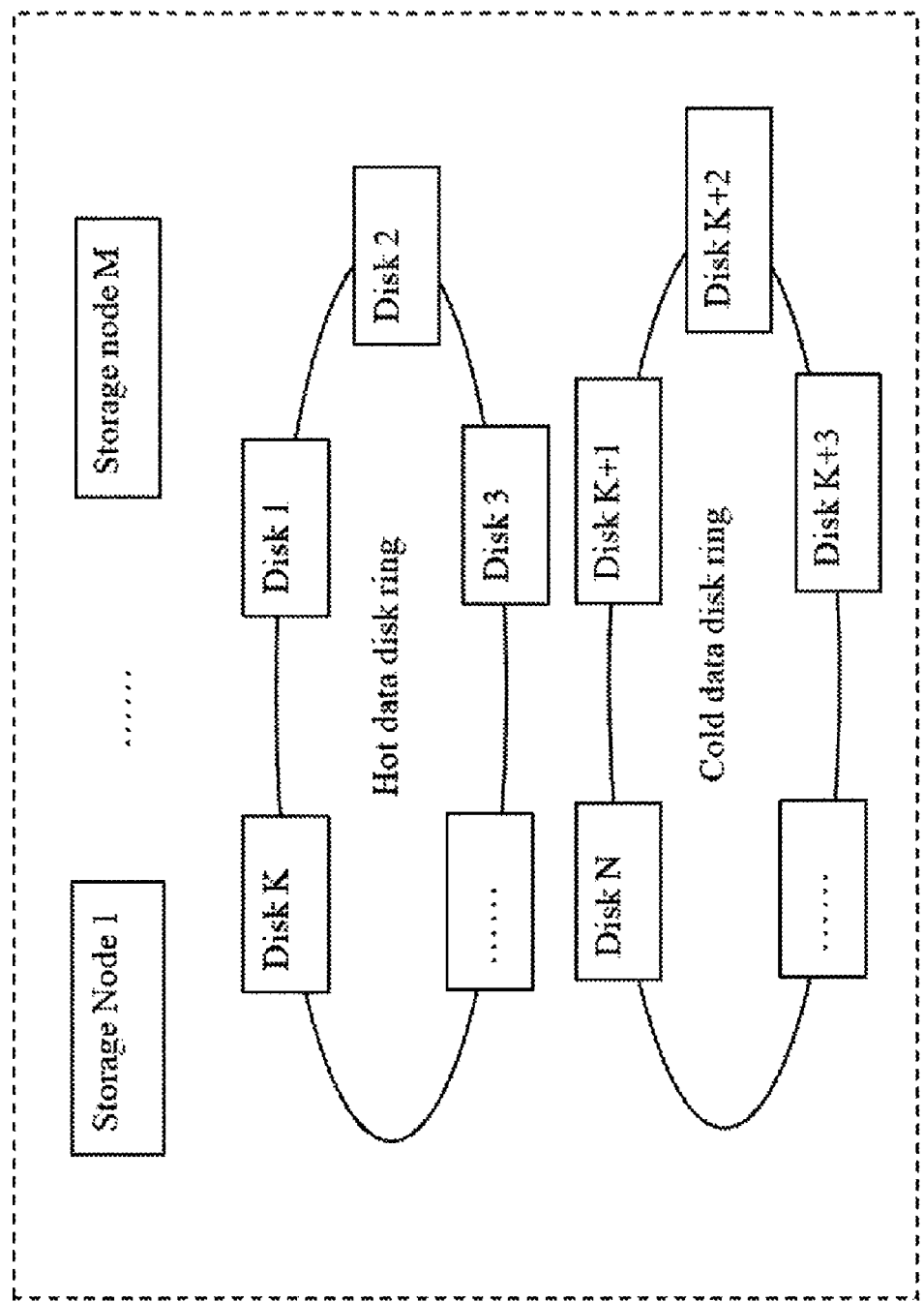
FIG. 4 shows a distributed storage structure with two zones formed from the distributed storage structure with one zone shown in FIG. 2.

The distributed storage structure with one zone shown in FIG. 2 will change into the distributed storage structure with two zones shown in FIG. 4 after using the method shown in FIG. 3. The two zones are a hot data disk ring and a cold data disk ring. Disk labels shown in FIG. 2 and FIG. 4 may be the same or different. A total number of disks in both the cold data disk ring and the hot data disk ring in FIG. 4 (N disks) is the same as the total number of disks (N) in the main disk ring with one zone in FIG. 2.

In an embodiment in step S301, a user can manually specify which target data are the hot target data and which target data are the cold target data. This approach is particularly applicable to the condition in which types of target data are relatively small, but the data size in each target data type are relatively large. Since there is no need for a complicated determining algorithm because of the user's manual input, power energy usage can be reduced.

In another embodiment in step S301, the number of I/O operations for a target data can be used to determine whether the target data is a cold target data or a hot target data. In a particular embodiment, two steps are used, step 1 and step 2. In step 1, the number of I/O operations for each target data within the predefined time period is recorded; and in step 2, each target data are determined as a cold target data or a hot target data according to the predefined conditions of the cold or the hot target data. Here, the predefined time period can be set by a user according to a situation, and can also be set by a system administrator according to their experience. For example, the period can be set as a number of days, weeks, months, years and so on. The predefined conditions of the cold target data or the hot target data may be that the target data whose total number of I/O operations is smaller than a first predefined threshold are the cold target data, otherwise the target data are the hot target data. A pre-defined condition may be that the target data whose average number of I/O operations per day is smaller than the first predefined threshold are the cold target data, otherwise the target data are the hot target data. The first predefined threshold may be set according to a situation of the target data. I/O operations of each target data can be directly recorded, and then statistics could be obtained at the end of the predefined time period. For example, for each I/O operation, an I/O operation time, an ID of the target data, and an I/O operation type (e.g. read operation or write operation) can be recorded. In another embodiment, a count of I/O operations may be recorded using a counter each time an I/O operation takes place for a target data, instead of recording a specific I/O operation. The counts for each target data in each counter may be compared with a predefined count threshold at the end of the predefined time period to determine whether the target data is hot target data or cold target data.

In a preferred embodiment, determination results of the target data are also stored, which can be added as tags of the target data. In another preferred embodiment, a separate cold target data file is used to store IDs of target data judged as the cold target data while a separate hot target data file is used to store IDs of target data judged as hot target data.

In an embodiment of step S302, before the cold data disk ring is formed, a determination may be made on the formation of the cold data disk ring. There may not be a benefit to forming the cold data ring and the migration of the target cold data if the benefits are not achieved. This may be the case if the data size of the cold target data is very small, and therefore there is no need to form the cold data disk ring. The method of determining whether there is a need to form the cold data disk ring can be implemented using a ratio of the cold target data to the hot target data after the cold target data are identified. For example, if the ratio of the cold target data to the hot target data is greater than a second predefined threshold, then the need to form the cold data disk ring is confirmed; otherwise, the need is denied. The second predefined threshold can be set by a system administrator.

In an embodiment in step S302, the principle of disk selection to form the cold data disk ring from the disks within the main disk ring may be based on a position of the cold target data on the disks. A selection method may be used. In an implementation, a data size of the cold target data on each disk within the main disk ring may be calculated, then the disks are sorted according to the data size of the cold target data. A plurality of disks with a substantial number of cold target data are selected to form the cold data disk ring according to the sorting results, such that total storage space of the selected disks satisfies a space requirement needed by a total of the cold target data, and the number of selected disks is a minimum. For example, there are 20 2 terabyte (2 TB) disks in the main disk ring, and the total data size of the cold target data is 2.6 TB. The disks with an ID number of 2, 5 and 8 store a relatively higher data size of cold target data than the remaining disks, and the code target data size therein is 1.0 TB, 0.5 TB and 0.3 TB respectively. Disks with ID number as 2 and 5 are selected to form the cold data disk ring, in which total storage space is 4.0 TB, the closest to a requirement of total size of cold target data. The disks with ID number as 2 and 5 also meet the requirement of the minimum number of disks. Disks with the remaining ID numbers form the hot data disk ring. In another embodiment, the ratio of the cold target data size to the total data size on each disk within the main disk ring may be calculated, and a plurality of disks where the ratio of the cold target data size to the total data size meets a predefined third threshold requirement are selected to form the cold data disk ring. This selection is according to the ratio of the cold target data size to the total data size on each disk so that total storage space of the selected disks satisfies the space requirement needed by all cold target data, and the number of selected disks is the minimum. The ratio of the cold target data size is defined as the proportion of the cold target data size on a disk to all target data size on the disk, and all target data on the disk is total storage space used by the disk. In another embodiment, the ratio of the cold target data size can be defined as the proportion of the cold target data on a disk to the storage space of the disk. For example, there are 10 2 TB disks and 10 1 TB disks in the main disk ring, and the total data size of the cold target data is 2.6 TB. The set threshold ratio of the cold target data is 50%. Disks with the ID number as 1, 2, 10, 18, and 19 satisfy the threshold ratio of the cold target data requirement, and they have been put into the queue, wherein the data size of disks with ID number 1, 2 and 10 is 2.0 TB, and the data size of disks with ID number as 18 and 19 is 1.0 TB. Since disks can be selected according to the above requirement, then each disk combinations with ID number as 1 and 18, 1 and 19, 2 and 18, 2 and 19, 10 and 18, or 10 and 19, can be selected to form the cold data disk ring, in which each storage space is the closest to the data size which the cold target data requires. Disks with remaining ID numbers form the hot data disk ring if one group of the above two disks is selected to form the cold data disk ring. Once the disks are selected for the cold data disk ring and the hot data disk ring, the target data migration may begin.

In the previous examples, further optimized implementation can be carried out, for example a used time of a disk may be considered, e.g. a disk with a highest usage time may be selected to form the cold data disk ring to improve the service life of the whole system since I/O operation for the cold target data is less. The usage time of a disk can be expressed as the highest number of I/O operations or usage years, etc. For example, the statistical number of I/O operations of disks with ID number as 1, 2, 10, 18, 19 are 120000, 100000, 140000, 90000 and 150000 respectively. The statistical number can be used as the usage time of the disk, therefore the disks with ID number 10 and 19 are selected to form the cold data disk ring. The implementation of using the usage years of disks or a combination of the highest number of I/O accesses and the usage years of disks as the used time is similar in the manner of implantation of using the highest number of I/O accesses of disks as the used time of disks. Thus, a detailed description is omitted here.

Factors can be assigned with different weights to select the disks to form the cold data disk ring based on a comprehensive evaluation. The factors may include the data size of the cold target data on each disk, the ratio of the cold target data on each disk and the used time of each disk. There may be numerous variants which are within the scope of the invention.

Once disks within the cold data disk ring are determined, the remaining disks form the hot data disk ring.

Once the disks within the cold data disk ring and the hot data disk ring are determined, the cold target data on disks not within the cold data disk ring can be migrated onto disks within the cold data disk ring. Likewise the hot target data on disks not within the hot data disk ring can be migrated onto disks within the hot data disk ring. Because the storage space of disks within the cold data disk ring is close to the total data size of the cold target data, it may be better to first migrate the hot target data on the disks within the cold data disk ring during migration, and then migrate the cold target data onto the disks within the cold data disk ring. A main purpose of the cold data disk ring is to reduce energy consumption, the method of placing the cold target data in the cold data disk ring may also affect the consumption of electric energy. The cold target data placement may follow the principles of keeping I/O operations focused on disks with a minimum power consumed within the cold data disk ring. Disks with the lowest energy consumption can be the disks with the lowest minimum spinning rate. Therefore, during the migration of the code target data from the hot data disk ring to the cold data disk ring, all disks can be sorted based on its energy consumption, then each cold target data can be migrated onto the disks with lower energy consumption within the cold data disk ring, until the disk is full. Afterwards, a similar operation may be carried out to the next disk with lower energy consumption. Alternatively the disks with energy consumption less than a threshold are selected, and the cold target data is migrated onto the selected disks, and so on.

During the migration process for the hot target data, the hot target data may also be migrated onto the disks with low power consumption within the hot data disk ring so as to decrease the energy consumption of the system.

In the embodiment of step S304, disk spinning rates within the cold data disk ring can be reduced to the lowest rate of the disk to save the most energy consumption. Also, the number of I/O operations of disks in the cold data disk ring can be firstly counted, then spinning rates of disks with the larger number of I/O operations are reduced less while the spinning rates of disks with smaller number of I/O operations are reduced more so that the power consumption can be decreased while the access speed can be increased.

According to an embodiment of the invention, the method shown in FIG. 3 also includes step S305 (not shown in FIG. 3), in which it is determined whether each cold target data on disks within the cold data disk ring satisfies requirements of the cold target data according to predefined requirements of the cold target data. Step S306 (not shown in FIG. 3) includes determining which cold target data may dissatisfy the requirements of the cold target data, and migrating the cold target data onto disks within the hot data disk ring in response to the cold target data on disks within the cold data disk ring dissatisfying the requirements of the cold target data. According to a further embodiment of the invention, the method shown in FIG. 3 also includes step S307 (not shown in FIG. 3), in which it is determined whether each hot target data on disks within the hot data disk ring still satisfies the requirements of the hot target data according to the predefined requirements of the hot target data; and step S308 (not shown in FIG. 3), in which hot target data dissatisfying the requirements of hot target data are migrated onto disks within the cold data disk ring in response to the hot target data on disks within the hot data disk ring dissatisfying the requirements of the hot target data.

According to an embodiment of the invention, if the storage space provided by the cold data disk ring or the hot data disk ring is insufficient in the method shown in FIG. 3, the method can be rerun so that the storage space provided by the cold data disk ring or the hot data disk ring can be reallocated. In another embodiment, the target data on disks with low storage space in the cold data disk ring may be migrated if there is not enough storage space for hot target data, then the disks can be grouped into the hot data disk ring, etc.

Figure 5:
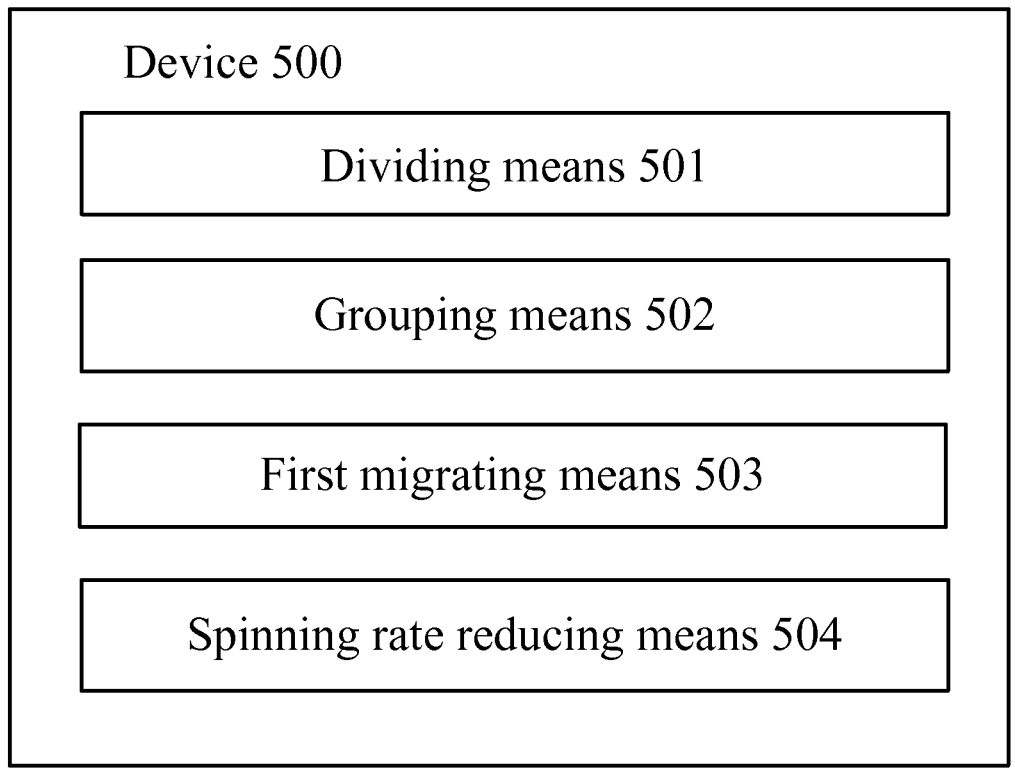
FIG. 5 schematically shows the block diagram of a device for disk management in the distributed storage system according to an embodiment of the invention.

Based on the same inventive concept, the invention also provides a device for disk management in a distributed storage system, wherein the distributed storage system includes a plurality of disks within a main disk ring, and the disks store target data. FIG. 5 schematically shows a block diagram of a device for disk management in a distributed storage system according to an embodiment of the invention. The device for disk management shown in FIG. 5 includes: dividing means 501, configured to divide the target data into cold target data and hot target data; grouping means 502, configured to group some disks within the main disk ring into a cold data disk ring and the remaining disks into a hot data disk ring based on the cold target data's and the hot target data's positions on disks; a first migrating means 503, configured to migrate the cold target data on disks not within the cold data disk ring onto disks within the cold data disk ring while migrating the hot target data on disks not within the hot data disk ring onto disks within the hot data disk ring; and spinning rate reducing means 504, configured to reduce spinning rates of disks within the cold data disk ring.

According to an embodiment of the invention, the dividing means 501 is further configured to determine whether a target data is a cold target data or a hot target data by the number of I/O operations for the target data.

According to an embodiment of the invention, the device 500 further includes (not shown in FIG. 5): a first determining means configured to determine whether there is a need to form the cold data disk ring before forming the cold data disk ring. And according to a further embodiment of the invention, the first determining means is further configured to determine whether there is a need to form the cold data disk ring according to a ratio of the cold target data size to the hot target data size.

According to an embodiment of the invention, the dividing means 502 of the device 500 further includes (not shown in FIG. 5): data size of the cold target data calculating means configured to calculate a data size of the cold target data on each disk within the main disk ring; sorting means configured to sort each disk according to the data size of the cold target data on it; and a second selecting means configured to select a plurality of disks with substantial numbers of cold target data to form the cold data disk ring according to the sorting results so that a total storage space of the selected disks satisfies the space needed by all cold target data, and the number of selected disks is the minimum.

According to an embodiment of the invention, the dividing means 502 of the device 500 further includes (not shown in FIG. 5): a ratio of the cold target data calculating means configured to calculate a ratio of the cold target data on each disk within the main disk ring; and a third selecting means configured to select a plurality of disks with the ratio of the cold target data meeting a predefined third threshold to form the cold data disk ring according to the ratio of the cold target data on each disk so that the total storage space of the selected disks satisfies the space needed by all cold target data, and the number of selected disks is the minimum number of disks.

According to an embodiment of the invention, a used time of a disk is considered for the grouping means 502 of the device 500 in selecting disks to form the cold data disk ring.

According to an embodiment of the invention, disk selection for the first migrating means 503 of the device 500 follows the principle of keeping I/O operations focused on disks with the minimum power consumption within the cold data disk ring.

According to an embodiment of the invention, the device 500 further includes (not shown in FIG. 5) a second determining means configured to determine whether each cold target data on disks within the cold data disk ring satisfies requirements of the cold target data according to predefined requirements of the cold target data; second migrating means configured to migrate cold target data dissatisfying the requirements of the cold target data onto disks within the hot data disk ring in response to the cold target data on disks within the cold data disk ring dissatisfying the requirements of the cold target data; third determining means configured to determine whether each hot target data on disks within the hot data disk ring still satisfies requirements of the hot target data according to predefined requirements of the hot target data; and third migrating means configured to migrate hot target data dissatisfying the requirements of the hot target data onto disks within the cold data disk ring in response to the hot target data on disks within the hot data disk ring dissatisfying the requirements of hot target data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can remain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the aforesaid. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the aforesaid. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java® (Java® and all Java® based trademarks and logos are trademarks or registered trademarks of Sun Microsystems, Inc. and/or its affiliates), Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing the state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which includes one or more executable instructions for implementing the specified logical function(s). It may also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for disk management in a distributed storage system, wherein the distributed storage system comprises one or more disks within a main disk ring, and the one or more disks store target data, the method comprising:
   dividing the target data into cold target data and hot target data based on a user specification;
   grouping one or more disks in the main disk ring into a cold data disk ring and grouping one or more remaining disks in the main disk ring into a hot data disk ring, based on calculating a data size of the cold target data on each of the one or more of disks within the main disk ring, sorting the one or more disks within the main disk ring according to the data size of the cold target data on each of the one or more disks within the main disk ring, and selecting one or more disks from the one or more disks of the main disk ring which have a substantial data size of cold target data, to form the cold data disk ring according to the sorting results, such that a total data size of the selected one or more disks satisfies a data size required for the cold target data, and the number of selected disks is a minimum number of disks;
   migrating the cold target data which is on a disk not within the cold data disk ring onto a disk within the cold data disk ring, and migrating the hot target data which is on a disk not within the hot data disk ring onto a disk within the hot data disk ring; and
   reducing a spinning rate of the one or more disks in the cold data disk ring.

2. The method according to claim 1, wherein the step of dividing the target data into cold target data and hot target data comprises determining whether a target data is cold target data or hot target data depending on whether a number of I/O operations for the target data is less than or exceeds a threshold number of I/O operations.

3. The method according to claim 1, further comprising:
   determining whether there is a need to form the cold data disk ring before forming the cold data disk ring.

4. The method according to claim 3, further comprising:
   determining whether there is a need to form the cold data disk ring dependent on a ratio of cold target data size to hot target data size.

5. The method according to claim 1, wherein grouping one or more disks within the main disk ring into the cold data disk ring and grouping the one or more remaining disks within the main disk ring into the hot data disk ring, based on calculating a data size of the cold target data on each of the one or more of disks within the main disk ring further comprises:
   calculating a ratio of the cold target data size to hot target data size on each of the one or more disks within the main disk ring; and
   selecting one or more disks with the ratio of the cold target data to the total data size meeting a predefined threshold requirement to form the cold data disk ring according to the ratio of the cold target data size to the total data size on each disk, so that a total storage space of the one or more disks satisfies a total data size required for the cold target data, and the number of selected disks is a minimum number of disks.

6. The method according to claim 1, wherein grouping one or more disks within the main disk ring into a cold data disk ring and the one or more remaining disks within the main disk ring into a hot data disk ring based on calculating a data size of the cold target data on each of the one or more of disks within the main disk ring further comprises considering a usage time of a disk in selecting the one or more disks to form the cold data disk ring.

7. The method according to claim 1, wherein migrating the cold target data which is on a disk not in the cold data disk ring onto a disk within the cold data disk ring comprises selecting a disk for the cold data disk ring based on the selected disk comprising an energy consumption lower than an energy consumption threshold.

8. The method according to claim 1, wherein migrating the cold target data which is on a disk not within the cold data disk ring onto a disk within the cold data disk ring, and migrating the hot target data which is on a disk not within the hot data disk ring onto a disk ring within the hot data disk comprise:
   determining whether the cold target data on the one or more disks within the cold data disk ring satisfies a requirement of the cold target data, according to a predefined requirement of the cold target data;
   migrating the cold target data dissatisfying the requirement of the cold target data onto the one or more disks in the hot data disk ring, in response to the cold target data on the one or more disks within the cold data disk ring dissatisfying the requirement of the cold target data;
   determining whether each hot target data on the one or more disks within the hot data disk ring satisfies a requirement of the hot target data, according to a predefined requirement of the hot target data; and
   migrating hot target data dissatisfying the requirement of hot target data onto the one or more disks within the cold data disk ring, in response to the hot target data on the one or more disks within the hot data disk ring dissatisfying the requirement of the hot target data.

9. A computer program product for disk management in a distributed storage system, wherein the distributed storage system comprises one or more disks in a main disk ring, and the one or more disks store target data, the computer program product comprising:
one or more computer-readable storage media and program instructions stored on the one or more computer-readable storage media, the program instructions comprising:
program instructions to divide the target data into cold target data and hot target data based on a user specification;
program instructions to group one or more disks in the main disk ring into a cold data disk ring and program instructions to group one or more remaining disks in the main disk ring into a hot data disk ring, based on program instructions to calculate a data size of the cold target data on each of the one or more disks within the main disk ring, program instructions to sort the one or more disks within the main disk ring according to the data size of the cold target data on each of the one or more disks within the main disk ring, and program instructions to select one or more disks from the one or more of disks of the main disk ring which have a substantial data size of cold target data, and program instructions to form the cold data disk ring according to the sorting results, such that the total data size of the selected one or more disks satisfies a data size required for the cold target data, and the number of selected disks is a minimum number of disks;
program instructions to migrate the cold target data which is on a disk not within the cold data disk ring onto a disk within the cold data disk ring, and program instructions to migrate the hot target data which is on a disk not within the hot data disk ring onto a disk within the hot data disk ring; and
program instructions to reduce a spinning rate of the one or more disks in the cold data disk ring.

10. The computer program product according to claim 9, wherein
the program instructions to divide the target data into cold target data and hot target data comprise program instructions to determine whether a target data is a cold target data or a hot target data depending on whether a number of input/output (I/O) operations for the target data is less than or exceeds a threshold number of I/O operations.

11. The computer program product according to claim 9, further comprising:
program instructions to determine whether there is a need to form the cold data disk ring before forming the cold data disk ring.

12. The computer program product according to claim 11, further comprising:
program instructions to determine whether there is a need to form the cold data disk ring dependent on a ratio of cold target data size to hot target data size.

13. The computer program product according to claim 9, wherein the program instructions to group one or more disks within the main disk ring into the cold data disk ring and the program instructions to group the one or more remaining disks within the main disk ring into the hot data disk ring, based on program instructions to calculate a data size of the cold target data on each of the one or more of disks within the main disk ring further comprise:
program instructions to calculate a ratio of the cold target data size to hot target data size on each of the one or more disks within the main disk ring; and
program instructions to select one or more disks with the ratio of the cold target data size to the total data size meeting a predefined threshold requirement to form the cold data disk ring according to the ratio of the cold target data size to the total data size on each disk, so that a total storage space of the one or more disks satisfies a data size required for the cold target data, and the number of selected disks is a minimum number of disks.

14. The computer program product according to claim 9, wherein the program instructions to group one or more disks within the main disk ring into the cold data disk ring and the program instructions to group the one or more remaining disks within the main disk ring into the hot data disk ring based calculating a data size of the cold target data on each of the one or more of disks within the main disk ring further comprise program instructions to consider a usage time of a disk in selecting the one or more disks to form the cold data disk ring.

15. The computer program product according to claim 9, wherein the program instructions to migrate the cold target data which is on a disk not within the cold data disk ring onto a disk within the cold data disk ring further comprise program instructions to select a disk for the cold data disk ring based on the selected disk comprising an energy consumption lower than an energy consumption threshold.

16. The computer program product according to claim 9, wherein the program instructions to migrate the cold target data which is on a disk not within the cold data disk ring onto a disk within the cold data disk ring, and the program instructions to migrate the hot target data which is on a disk not within the hot data disk ring onto a disk within the hot data disk ring comprise:
program instructions to determine whether the cold target data on the one or more disks within the cold data disk ring satisfies a requirement of the cold target data, according to a predefined requirement of the cold target data;
program instructions to migrate the cold target data dissatisfying the requirement of the cold target data onto the one or more disks in the hot data disk ring, in response to the cold target data on the one or more disks within the cold data disk ring dissatisfying the requirement of the cold target data;
program instructions to determine whether each hot target data on the one or more disks within the hot data disk ring satisfies a requirement of the hot target data, according to a predefined requirement of the hot target data; and
program instructions to migrate hot target data dissatisfying the requirement of hot target data onto the one or more disks within the cold data disk ring, in response to the hot target data on the one or more disks within the hot data disk ring dissatisfying the requirement of the hot target data.

17. A computer system for disk management in a distributed storage system, wherein the distributed storage system comprises one or more disks within a main disk ring, and the one or more disks store target data, the computer system comprising:
one or more computer processors, one or more computer-readable storage media, and program instructions stored on the one or more computer-readable storage media for execution by at least one or more of the computer processors, the program instructions comprising:

one or more computer-readable storage media and program instructions stored on the one or more computer-readable storage media, the program instructions comprising:

program instructions to divide the target data into cold target data and hot target data based on a user specification;

program instructions to group one or more disks in the main disk ring into a cold data disk ring and program instructions to group one or more remaining disks in the main disk ring into a hot data disk ring, based on program instructions to calculate a data size of the cold target data on each of the one or more disks within the main disk ring, and program instructions to sort the one or more disks within the main disk ring according to the data size of the cold target data on each of the one or more disks within the main disk ring, program instructions to select one or more disks from the one or more of disks of the main disk ring which have a substantial data size of cold target data, and program instructions to form the cold data disk ring according to the sorting results, such that the total data size of the selected one or more disks satisfies a data size required for the cold target data, and the number of selected disks is a minimum number of disks;

program instructions to migrate the cold target data which is on a disk not within the cold data disk ring onto a disk within the cold data disk ring, and program instructions to migrate the hot target data which is on a disk not within the hot data disk ring onto a disk within the hot data disk ring; and program instructions to reduce a spinning rate of the one or more disks in the cold data disk ring.

18. The computer system according to claim 17, wherein the program instructions to divide the target data into cold target data and hot target data comprise program instructions to determine whether a target data is a cold target data or a hot target data depending on whether a number of input/output (I/O) operations for the target data is less than or exceeds a threshold number of I/O operations.

* * * * *